(12) United States Patent
Jungck

(10) Patent No.: US 7,844,740 B2
(45) Date of Patent: Nov. 30, 2010

(54) SYSTEM AND METHOD FOR DYNAMIC COMPRESSION OF DATA

(75) Inventor: Peder J. Jungck, San Carlos, CA (US)

(73) Assignee: CloudShield Technologies, Inc., Sunnyvale, CA (US)

( * ) Notice: Subject to any disclaimer, the term of this patent is extended or adjusted under 35 U.S.C. 154(b) by 1465 days.

(21) Appl. No.: 10/642,010

(22) Filed: Aug. 15, 2003

(65) Prior Publication Data

US 2004/0064588 A1 Apr. 1, 2004

Related U.S. Application Data

(63) Continuation of application No. 09/602,128, filed on Jun. 23, 2000, now Pat. No. 6,728,785.

(51) Int. Cl.
*G06F 15/16* (2006.01)

(52) U.S. Cl. .................... 709/247; 709/231; 709/245

(58) Field of Classification Search ............ 709/247, 709/245, 231
See application file for complete search history.

(56) References Cited

U.S. PATENT DOCUMENTS

| | | | | |
|---|---|---|---|---|
| 5,805,820 | A | 9/1998 | Bellovin et al. | 395/200.55 |
| 5,938,737 | A | 8/1999 | Smallcomb et al. | 709/247 |
| 5,953,503 | A | 9/1999 | Mitzenmacher et al. | 395/200.33 |
| 5,970,177 | A * | 10/1999 | Chinnock | 382/244 |
| 5,991,713 | A | 11/1999 | Unger et al. | 704/9 |
| 6,014,660 | A | 1/2000 | Lim et al. | 707/3 |
| 6,016,512 | A | 1/2000 | Huitema | 709/245 |
| 6,046,980 | A | 4/2000 | Packer | 370/230 |
| 6,052,718 | A | 4/2000 | Gifford | 709/219 |
| 6,070,191 | A | 5/2000 | Narendran et al. | 709/226 |
| 6,073,168 | A | 6/2000 | Mighdoll et al. | 709/217 |
| 6,084,878 | A | 7/2000 | Crayford et al. | 370/389 |
| 6,121,903 | A * | 9/2000 | Kalkstein | 341/63 |

(Continued)

FOREIGN PATENT DOCUMENTS

EP  0 865 180 A2  3/1998

(Continued)

OTHER PUBLICATIONS

John Pescatore, Gartner Analyst, "Commentary: Digging into the DNS foundation," obtained at internet address, http://news.cnet.com/news/0-1005-202-2080091.html, Jun. 15, 2000.

(Continued)

*Primary Examiner*—Hassan Phillips
*Assistant Examiner*—Glenford Madamba
(74) *Attorney, Agent, or Firm*—Brinks Hofer Gilson & Lione

(57) ABSTRACT

A method of transferring a compressed web page over a computer network without affecting the existing web server applications and processes. The compressor intercepts a request from a workstation for the web page. A second request is transmitted to the server from the compressor for the original, uncompressed web page. The web page is selectively compressed in the compressor. Then the compressed web page is transmitted to the workstation. Optionally, some of the files associated web page, such as image files, are also compressed and the references to the compressed associated files is changed to reflect any change in the name of the compressed associated files.

28 Claims, 3 Drawing Sheets

U.S. PATENT DOCUMENTS

| | | | |
|---|---|---|---|
| 6,385,656 B1* | 5/2002 | Appelman | 709/247 |
| 6,449,658 B1* | 9/2002 | Lafe et al. | 709/247 |
| 6,735,186 B1* | 5/2004 | Leppinen | 370/338 |
| 2004/0049598 A1* | 3/2004 | Tucker et al. | 709/246 |

FOREIGN PATENT DOCUMENTS

| | | |
|---|---|---|
| WO | WO 98/17039 | 4/1998 |
| WO | WO 99/05584 | 2/1999 |
| WO | WO 99/09725 | 2/1999 |
| WO | WO 99/27684 | 6/1999 |
| WO | WO 99/60459 | 11/1999 |
| WO | WO 00/14938 | 3/2000 |
| WO | WO 00/27092 | 5/2000 |
| WO | WO 00/28713 | 5/2000 |

OTHER PUBLICATIONS

Rainbow Technologies Products, "CryptoSwift eCommerce Accelerator," obtained at internet address, http://isg.rainbow.com/products/cs_1.html, Aug. 5, 2000.

FlowWise Networks, Inc., "AutoRoute™ Automatic Configuration of Layer 3 Routing," www.flowwise.com.

FlowWise, "Router Accelerator—RA 7000 from FlowWise," obtained at internet address http://www.flowise.com/products/ra7000.htm.

Intel® IXP1200 Network Processor, obtained at internet address, http://developer.intel.com/design/network/ixp1200.htm.

Marshall Brain, How Stuff Works, "How Web Servers and the Internet Work," obtained at internet address http://www.howstuffworks.com/web-server.htm.

Marshall Brain, How Stuff Works, "How Domain Name Servers Work," obtained at internet address http://www.howstuffworks.com/dns.htm.

Curt Franklin, How Stuff Works, "How Routers Work," obtained at internet address http://www.howstuffworks.com/router.htm.

Microsoft Corporation, Sep. 1998 "Introduction to TCP/IP," obtained at internet address http://msdn.microsoft.com/library/backgrnd/html/tcpipintro.htm.

Robert Stone, "CenterTrack: An IP Overlay Network for Tracking DoS Floods," Article Oct. 1, 1999, pp. 1-9.

Chapter 1 TCP/IP Fundamentals, obtained at internet address http://webdocs.sequent.com/docs/tcpoac01/ch_1.htm, pp. 1-28.

Cheng Wu, "Web Switching: A New Generation of Networking," pp. 1-3.

ArrowPoint Communications™ Article, "A Comparative Analysis of Web Switching Architectures," pp. 1-11.

ArrowPoint Communications™, Brochure, "The Top 12 Benefits of Content Intelligence."

L. Peter Deutsch, "Deflate Compressed Data Format Specification," May 1996.

Antaeus Feldspar, Article, "An Explanation of the Deflate Algorithm," Sep. 11, 1997.

ArrowPoint Communications™ CDDCenter Vendor Listing, "ArrowPoint CS-50 Highlights" obtained at internet address http://www.cddcenter.com/arrowpoint.htm, May 21, 2000.

Peter Christy, Analyst Commentary, "When to Distribute Content—The Peters' Principles," obtained at internet address http://www.cddcenter.com/index.html, May 21, 2000.

Content Delivery 101: An Introduction to Content Distribution & Delivery.

CDDCenter, "How Do Caching and Content Delivery Really Differ?" obtained at internet address http://www.cddcenter.com/cachingvcontent.htm, pp. 1-4, May 21, 2000.

Internet Research Group "Infrastructure Application Service Providers," Feb. 2000, pp. 1-7.

Peter Christy, Internet Research Group, "Content Delivery Architectures: Why Doesn't One Size Fit All?" pp. 1-12.

Steven Vonder Haar, Inter@ctive Week, Feb. 14, 2000, "Content Delivery Shifts to Edge of Net," obtained at internet address http://www.zdnet.com/intweek/stories/news/0,4164,2436865,00.html, Dated May 22, 2000.

David Willis, Network Computing, "The Content-Delivery Edge," obtained at internet address http://www.networkcomputing.com/1103/1103colwillis.html, Dated May 22, 2000.

Phrack Magazine, "IP-spoofing Demystified (Trust-Relationship Exploitation)" vol. Seven, Issue Forty-Eight, File 14 of 18. pp. 1-9, obtained at internet address http://www.fc.net/phrack/files/p48/p48-14.html, Dated Jun. 5, 2000.

Eddie Mission, "What is Eddie?", obtained at internet address http://www.eddieware.org/what.html, Dated Apr. 21, 2000.

Cisco Enterprise Solutions, "Quality of Service," obtained at internet address http://www.cisco.com/warp/public/779/largeent/learn/technologies/qos/.

Cisco White Paper, "Delivering End-to-End Security in Policy-Based Networks," obtained at internet address, http://www.cisco.com/warp/public/cc/pd/nemnsw/cap/tech/deesp_wp.htm.

Technology Packeteer, obtained at internet address, http://www.packeteer.com/technology/index.cfm.

Overview Cisco Content Networking, obtained at internet address http://www.cisco.com/warp/public/cc/so/neso/ienesv/cxne/ccnov_ov.htm.

Overview Cisco Secure Policy Manager 2.0, obtained at internet address http://www.cisco.com/warp/public/cc/pd/sqsw/sqppmn/prodlit/secmn_ov.htm.

Alteon Web Systems, White Paper "Optimizing ISP Networks and Services with DNS Redirection," Aug. 1999.

Alteon Web Systems, White Paper "Virtual Matrix Architecture Scaling Web Services for Performance and Capacity," Apr. 2000.

Alteon Web Systems, White Paper, Questions and Answers, pp. 1-3.

3Com Technical Ppaers, Layer 3 Switching, May 1998.

Web Cache Communication Protocol Version 2, pp. C-1 to C-54.

RFC2267 Working Group—Denial of Service Counter Measures, Tele-conference Meeting Aug. 25, 2000, Moderator, Henry Teng of eBay.

Track-back Architecture General Requirements Version 0.1, Initial Draft submitted to Counter-DoS Solutions Working Group, Jul. 31, 2000, Edited by Bob Geiger, Recourse Technologies.

SwitchOn Networks, Inc., ClassiPI™ At-a-Glance.

C-Port™ A Motorola Company, C-5™ Digital Communications Processor, Product Brief, pp. 1-8, May 4, 2000.

Peder Jungck, "Building a Faster Cache Server" A Theoretical Whitepaper, Silicon Valley Internet Capital, pp. 1-19.

IXF1002 Dual Port Gigabit Ethernet MAC, Product Brief, Levon One™ an Intel Company.

NetLogic Microsystems Product Overview.

Agere, Inc. "The Challenge for Next Generation Network Processors", Sep. 10, 1999.

Phillips Semiconductors' VMS747 Security Processor Overview.

Cisco Systems, Cisco 12000 Series GSR, "Performing Internet Routing and Switching at Gigabit Speeds," obtained at internet address, http://www.cisco.com/warp/public/cc/pd/rt/12000/.

Cisco Systems, "Cisco 10000 Edge Service Router," obtained at internet address, http://www.cisco.com/warp/public/cc/pd/rt/10000/.

Nortel Networks™ "Passport 8600 Routing Switch," obtained at internet address, http://www.nortelnetworks.com/products/01/passport/8600/index.html.

Lucent Technologies, "InterNetworking Systems," obtained at internet address, http://www.lucent.com/ins/products/grf/.

Lucent Technologies, "InterNetworking Systems," obtained at internet address, http://www.lucent.com/ins/products/grf/grf1600.html.

Juniper Networks, "M20 Internet Backbone Router," Datasheet, obtained at internet address, http://www.juniper.net/products/dsheet/100009.html.

Juniper Networks, "M40 Internet Backbone Router," Datasheet, obtained at internet address, http://www.juniper.net/products/dsheet/100001.html.

Juniper Networks, Inc., "M160 Internet Backbone Router" Datasheet, obtained at internet address, http://www.juniper.net/products/dsheet/10012.

Rajeev Kumar, Intel Confidential, "IXP1200 Overview".

Intel "IXP1200 Network Processor," Datasheet, pp. 1-109 (out of 146 pages), May 2000.

Cisco 7500 Series Routers, pp. 1-2, obtained at internet address http://www.cisco.com/warp/public/cc/pd/rt/7500/.

SqueezePlay product described at www.innermedia.com in Beta as "SpeedBrowse" Apr. 21, 2001. http://web.archive.org/web/20010515234313/http://www.innermedia.com/, pp. 1-3.

JetNexus product described at http://www.preactholdings.com/performance/products/jetnexus/ First customer install Dec. 7, 2001 http://www.webmetrics.co.uk/Documents/CaseStudies/jetNEXUS_William%20Hill_CaseStudy.pdf, p. 1.

PipeBoost product described at http://www.pipeboost.com Released Nov. 30, 1999 http://soft.necromancers.ru/prog.php?prog_id=6261, pp. 1-2.

XCache, products described at XCompress http://www.xcache.com/home/default.asp?c=32&p=165 Announced May 15, 2000 http://web.archive.org/web/20010211030245/www.xcache.com/home/press_room_post_point_releases_xcache_delivering_dynamic_internet_content_6x_to_7x_faster.Htm, pp. 1-2.

NetScaler's webscaler product described at www.netscaler.com Announced May 1, 2000 http://www.nwfusion.com/archive/2000/94567_05-01-2000.html, 3 pages.

httpZip product described at http://www.port80software.com/products/httpzip/ Announced Dec. 17, 2002 http://www.port80software.com/about/press/121702, 7 pages.

Web I/O accelerator products described at http://www.redlinenetworks.com Described on website Aug. 29, 2000 http://web.archive.org/web/20000829044951/http://www.redlinenetworks.com/, 5 pages.

HyperSpace Accelerator hypertunnel product described at http://www.ehyperspace.com/products/hypertunnel.php?software=HyperTunnel%202.0 announced Nov. 10, 2001 Key technology released as freeware called mod_gzip around Nov. 2000. http://www.frtechbiz.com/displayarticledetail.asp?art_id=51999&search=hyperspace%2B, 4 pages.

Turboiis technology described at http://www.turboiis.com Described on website Jun. 3, 2002 http://web.archive.org/web/20020603144834/http://www.turboiis.com/, 1 page.

Array TM products described at http://www.arraynetworks.net/pr_10022002_2.html Press Release Oct. 2, 2002 http://www.businesswire.com/webbox/bw.100202/222750321.htm, 5 pages.

EngageIP Cache Server with Compression Plugin created by SlipStream described at http://www.logisense.com/compression.html, 1 page.

Slipstream Data www.slipstream.com Described as in beta test in press release May 7, 2002 http://www.slipstreamdata.com/news/pr020507.html, pp. 1-2.

Coheon Web Accelerator product described at http://www.fundamentech.com/products/coheon.htm In beta as of Aug. 1, 2003 http://www.fundamentech.com/products/coheon.htm, pp. 1-5.

Wayne Berry, 15 Seconds: Web Site compression described at http://www.internet.com/icomcgi/print/print.cgi?url=http://www.15seconds.com/issue/020314.htm. Mar. 14, 2002, pp. 1-6.

WebsiteOptimization.com "Chapter 18: Compressing the Web," described at http://www.websiteoptimization.com/speed/18/18-2.html, © 2002-2003 Web Site Optimization, LLC, last modified: Mar. 17, 2003, pp. 1-2.

WebsiteOptimization.com "Chapter 18: Compressing the Web," described at http://www.websiteoptimization.com/speed/18, © 2002-2003 Web Site Optimization, LLC, last modified: Jun. 27, 2003, pp. 1-5.

HTTP Compression Speeds up the Web, described at http://webreference.com/internet/software/servers/http/compression/, Copyright 2003 Jupitermiedia Corporation, Revised Apr. 20, 2002, pp. 1-6.

Hyperspace Communications, Inc. "HyperWeb" product, formerly named "HyperSpace", described at http://www.ehyperspace.com/products/hyperweb.php, Copyright © 2001 to 2003 HyperSpace Communications, Inc., pp. 1-3.

PacketShaper Express product brochure, pp. 1-4, Copyright © 1996-2003 Packeteer, Inc., pp. 1-4.

"Packeteer Enters Into Definitive Agreement to Acquire Internet Caching and Acceleration Infrastructure Software Company" press release Jul. 13, 2000, pp. 1-4, available at http://www.packeteer.com/news/pr.cfm?pr_ID=55.

Venturi Wireless Accelerators "Driving Successful Data Services for Mobile Operators", described at http://www.venturiwireless.com/, 1 page, formerly Fourelle, press release "Independent Tests Confirm Wireline/Wireless Performance of Fourelle's Compression Technology", pp. 1-2, available at http://web.archive.org/web/19980109233518/http:/fourelle.com/.

Vigos AG "High Performance Internet Technologies" brochure, described at http://www.vigos.com/ pp. 1-2, availability announced at "Innovative data compression for the Internet: VIGOS Website Accelerator provides speed and cost savings in the e-Business world. The pioneering development of a 21 years old Internet entrepreneur from Hagen (Germany) creates enormous international demand.", press release, pp. 1-2, Oct. 17, 2000, http://www.vigos.com/press/20001017.html.

* cited by examiner

SYSTEM AND METHOD FOR DYNAMIC COMPRESSION OF DATA

This application is a continuation of application Ser. No. 09/602,128, filed Jun. 23, 2000, now U.S. Pat. No. 6,728,785, which is hereby incorporated by reference herein.

BACKGROUND

The present invention relates to a method of compressing data for transmission.

The Internet is a publicly accessible worldwide network which primarily uses the Transport Control Protocol and Internet Protocol ("TCP/IP") to permit the exchange of information. The Internet supports several applications protocols including the Hypertext Transfer Protocol ("HTTP") for facilitating the exchange of HTML/World Wide Web ("WWW") content, File Transfer Protocol ("FTP") for the exchange of data files, electronic mail exchange protocols, Telnet for remote computer access and Usenet for the collaborative sharing and distribution of information.

Several compression techniques have been used to reduce the time required to transfer files. Compression can occur at the file or the bit stream level. Applications, such as PKZP™, compress files on a computer. Modems use bit stream level compression techniques to optimize throughput. Microsoft's Windows NT™ servers include IIS that can provide static web files in the deflate format. Some web browsers ("browsers") support the "deflate" format.

Traditionally, a workstation accesses a web page across the Internet by transmitting a request for the web page to a web server. The web server then processes the request and transmits the web page to the workstation. The web page is a file having hypertext markup language ("HTML") codes. Once the workstation receives the web page, the workstation analyzes the HTML codes for references to associated files, such as graphic files, video files, audio files and other files. The workstation then sends a second request to the web server for the associated files. The web server then sends the associated files to the workstation. This network congestion management mechanism is called "HTTP slow start."

Since the associated files are requested only after the initial web page file has been received and analyzed at the workstation, the speed of receiving the initial web page file is a controlling factor in the over all speed of viewing a web page. In order to utilize compression techniques as a speed enhancement, conventional systems require the web server to store separate pre-compressed web pages. Others also require the web server to send additional code to decode the web page.

BRIEF SUMMARY

A method of transferring a compressed web page over a computer network without affecting the existing web server applications and processes. The compressor intercepts a request from a workstation for the web page. A second request is transmitted to the server from the compressor for the original, uncompressed web page. The web page is selectively compressed in the compressor. Then the compressed web page is transmitted to the workstation.

BRIEF DESCRIPTION OF THE DRAWINGS

The present invention is described with reference to the accompanying figures. In the figures, like reference numbers indicate identical or functionally similar elements. Additionally, the left-most digit(s) of a reference number identifies the figure in which the reference number first appears.

DEFINITIONS

Figure 1:
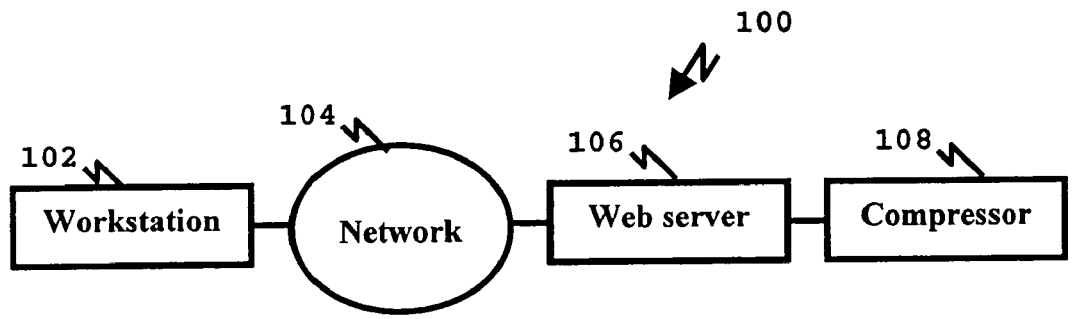
FIG. 1 is an illustration of an embodiment of the present invention including dynamic compression at the web server.

A proxy server with cache is a server that is located between a client application, such as a web browser, and a real server where the proxy is at the client's side of the network. The proxy server intercepts content requests to the real server to see if it can fulfill the requests itself out of its cache storage. If not, or if the proxy server does not have a cache, it substitutes its own IP address for that of the originating client, makes a notation to associate the returned response to the client, and forwards the request onto the real server.

A reverse proxy server is a server that is located between a client application, such as a web browser, and a real server at the server's side of the network. Optionally, the reverse proxy server has a cache.

A forward proxy server sits between a workstation and the Internet to ensure security, administrative control and optionally provide caching services. A forward proxy server can be associated with a gateway server which separates the workstation's local network from the Internet or other network. The forward proxy server can also be associated with a firewall server which protects the local network from outside intrusion. The forward proxy server receives content requests from workstations requesting web pages and web page content from the web server. The forward proxy server then transmits a request for the web page or content to the web server on the behalf of the workstation. The forward proxy server modifies the identity of the requestor to be that of the forward proxy server. This is typically achieved by altering the internet protocol address of the requester. A forward proxy server can also be a cache server.

Portable Network Graphics (PNG) format is a new bitmapped graphics format similar to the GIF format. A graphics file stored in the PNG format is more compressed than the same file stored in the GIF format. The conversion from GIF to PNG format is a lossless conversion. Web browsers such as Netscape Navigator™ and Microsoft Internet Explorer™ support PNG.

Internet Information Server ("IIS") is Microsoft's Web server that runs on Windows NT™ platforms. IIS supports the open-source compression algorithm called deflate.

Huffman encoding is a prefix coding prepared by a special algorithm. Each code is a series of bits, either 0 or 1 that represents an element in a specific "alphabet", such as the set of ASCII characters. This is the primary but not the only use of Huffman coding in the deflate compression technique.

A Huffman algorithm starts by assembling the elements of the alphabet, each one being assigned a weight, i.e., a number that represents its relative frequency within the data to be compressed. These weights may be guessed at beforehand, or they may be measured exactly by examining the data to be compressed, or some combination thereof. The elements are selected two at a time, the elements with the lowest weights being chosen first. The two chosen elements are made to be leaf nodes of a node with two branches. For example, a set of elements and weights can looked like this:

| | |
|---|---|
| A | 16 |
| B | 32 |
| C | 32 |
| D | 8 |
| E | 8 |

Lempel-Ziv (LZ) encoding including LZ77, LZ78, LZW and others are dictionary based substitution compression techniques. LZ77 compression works by finding sequences of data that are repeated. LZ77 compression uses a "sliding window" that is, at any given point in the data, there is a record of what characters went before.

Deflate compression can be accomplished with a variety of techniques as defined in the deflate specification, RFC 1951, herein incorporated by reference. The three modes of compression available to the compressor include:

First, no compression. This mode is selected when the data analyzed has already been compressed.

Second, compression with LZ77 and then with standard Huffman coding. The trees that are used to compress in this mode are defined by the Deflate specification itself and preloaded in any deflate decoding capable software, and so no extra space needs to be taken to store those trees or send them to the receiver of the compressed file.

Third, compression with LZ77 and then with Huffman coding with trees that the compressor creates by examination of the file and stores along with the data.

The data is broken up in "blocks," and each block uses a single mode of compression. If the compressor wants to switch from non-compressed storage to compression with the trees defined by the specification, or to compression with specified Huffman trees, or to compression with a different pair of Huffman trees, the current block is ended and a new one begun.

HyperText Markup Language ("HTML") is the authoring language used to create documents on the World Wide Web (Web). HTML defines the structure and layout of a Web document by using a variety of tags and attributes. The correct structure for an HTML document starts with <HTML><HEAD> "text describing the document" </HEAD><BODY> and ends with </BODY></HTML>. The information included in the Web page is located between the <BODY> and </BODY> tags.

An example of an HTML reference to a image file called "cpu.gif" is:

<img border="0" src="cpu.gif" width="79" height="75">

There are numerous other HTML tags used to format and layout the information in a Web page. For example <P> is used to begin paragraphs and <I> and </I> are used to italicize text. Tags are also used to specify hypertext links.

Internet Server API ("ISAPI") is an application programming interface ("API") for Microsoft's Internet Information Server ("IIS") web server. ISAPI enables programmers to develop Web-based applications that run much faster than conventional CGI programs. ISAPI can support requests from multiple workstations with only a single instance running on the server. CGI requires a separate instance for each request.

ZLIB is lossless data compression technique that uses the deflate technique to compress only the body of web pages and not the headers.

DETAILED DESCRIPTION

Transfer speed of files over the Internet is a critical factor in the usability of the Internet. Many techniques currently exist to increase the speed of file transfers. The present invention intercepts web page requests then compresses the web page, which is usually an HTML file, and sends it to the requesting workstation in the compressed format. The requesting workstation then decompresses the web page before processing the web page. Optionally, the tags in the web page that point to image files, for example GIF files, are modified to point to modified image files of a different name, for example PNG files. This process can occur at an ISP or other form of point of presence to the Internet, at a forward proxy server, at a reverse proxy server, at a transparent proxy server or at the web server.

FIG. 1 is an illustration of an embodiment of the present invention including dynamic compression at the web server, i.e. as the content is served or transferred in response to the request, it is compressed. The system 100 includes a workstation 102, connected with a network 104 connected with a web server 106 that includes a compressor 108. The workstation 102 can be a personal computer, a network enabled mobile device such as a cellular telephone, a portable computer, a WebTV like device or other Internet appliance, a personal digital assistant such as a Palm Pilot™ manufactured by 3-Com Corporation, or other device that can communicate with a server. The network 104 can be the Internet, a private network, an intranet, or other network including a combination of networks. The web server 106 can be any computer that stores or retrieves web pages or web files for others over a network. The compressor 108 can be integrated with the web server 106 or a stand alone unit. For example, the compressor 108 can be a PCI adapter card in the web server 106 or it can be a separate computer connected with the web server 106.

In an embodiment illustrated in FIG. 1, a user at the workstation 102 sends a request to the web server 106 over the network 104 for a web page. The user may be running a web browser such as Internet Explorer™ or Netscape Navigator™. When the request reaches the web server 106, the compressor 108 intercepts the request and determines if the workstation 102 can process compressed web pages. Various mechanisms can be used by the compressor 108 to make this determination. In one embodiment, the compressor 108 analyzes the request to determine if the request's header contains a indication that the workstation can handle compressed files. For example, the header can contain a "request encoding=deflate" indication.

If the workstation can handle compressed files, then the compressor 108 compresses the web page returned by the web server 106 before the web page is transmitted to the workstation 102.

It is preferred that the web server 106 operations not be affected by the compressor 108. That is, the web server applications are not affected and the compressor 108 performs the compression transparently to the web server 106, e.g., neither data throughput nor data processing power is impacted.

Another embodiment of the compressor 108 utilizes a novel mode of deflate compression using LZ77 in combination with Huffman coding. The Huffman coding utilizes trees that are predefined based on an analysis of HTML codes. Since some HTML code must exist in every HTML page and others occur at frequencies that can be predicted, the Huffman tree can be generated before the compression to save time compressing the data. For example:

| HTML Code | Huffman Code |
|---|---|
| <html> | 0 |
| </html> | 1 |
| <head> | 00 |
| </head> | 01 |
| <title> | 000 |
| </title> | 001 |
| <b> | 10 |
| </b> | 11 |
| www. | 110 |
| <img src= | 1110 |
| <a href= | 1111 |

While the above is a simplified example, it illustrates how the most commonly occurring characters strings can be replaced by a predetermined Huffman tree that is optimized for HTML code.

In the embodiment shown in FIG. 1, when the compressor 108 is integrated with the web server 106, the compressor 108 can be a software application, a hardware implementation, or a combination of hardware and software. In an embodiment with a hardware compressor 108, the compressor 108 can be an adapter card in the web server 106 or a blade in a router, i.e. a rack mount printed circuit board or other type of adapter inserted in the backplane or motherboard or otherwise coupled with the router (not shown). In another embodiment, the compressor 108 is a box connected with the web server 106 via a SCSI bus, universal serial bus, parallel port, serial port, fiber channel, fast Ethernet, or other communication channel. In this embodiment, the web server 106 receives a request for a web page and an indication that the workstation 102 can handle web pages in the deflate format. The web server 106 processes the request similar to traditional web page requests, which can include using Microsoft's IIS and ISAPI. However, before the web page is transmitted over the network 104, it is sent to the compressor 108 for processing. The compressor 108 compresses the web page and optionally converts references to associated files such as image files in the web page to match a second naming convention. The web page is then transmitted over the network 104.

It is preferred that when the compressor 108 is called by the web server's API, two pointer addresses are provided. The first is the address of the data for the client and the second is the address to place the compressed data. Further it is preferred that the compressor 108 perform the encoding at a rate of at least 200 Mbps. The hash tables used for encoding are stored on the compressor 108 in a fast media such as flash memory or other integrated storage device. It is preferred that the hash tables be software programmable.

The ISAPI filter receives the data from the client, passes it to the compressor 108, and then sends the encoded data to the client.

It is preferred that the compressor 108 is a PCI interface adapter that supports Windows NT, Linux, OpenBSD, and Sun Solaris operating systems and supports Microsoft's IIS versions 4.0 and 5.0, Apache, Iplanet, and Lotus' Domino web server software. It is further preferred that the compressor 108 be a server co-processor to reduce the load on the web server's processing capacity and can process wire speeds compression of up to 45 Mbps and compresses web pages by a ratio of 40 to 1.

The workstation 102 can indicate that it wishes to receive web pages in a compressed format in a variety of ways. First, the workstation 102 can include in the web page request an indication flag that indicates that web page compression is acceptable. The same flag or an additional flag can be used to indicate that the associated files, for example GIF files, can be compressed. Second, the workstation 102 can send a request to the compressor 108 or data center 208 (FIG. 2) indicating that compression is acceptable for that workstation 102. Other means of indicating that the workstation 102 can accept compressed files can also be used. While the terms compressor and data center have been used to describe devices that are located near the web server and between the web server and the workstation, those terms are not limited to the embodiments used to illustrate their functionality.

Figure 2:
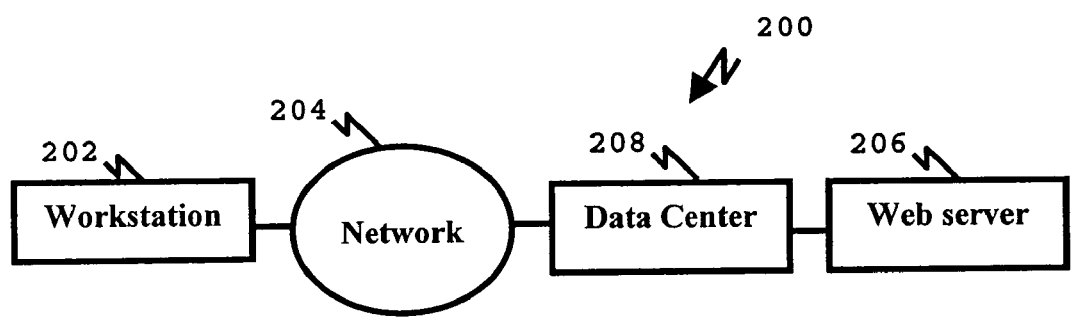
FIG. 2 is an illustration of an embodiment of the present invention including a data center near the web server.

FIG. 2 is an illustration of an embodiment of the present invention including a data center 208 near the web server 206 in a reverse proxy server configuration. The system 200 includes a workstation 202 connected with a network 204 connected with a data center 208 connected with the web server 206. The data center 208 intercepts web pages and compresses them before they are transmitted over the network 204 to the workstation 202. The data center 208 can be connected with the web server 206 via a network, a direct connection, or other means. It is preferred that the data center 208 is directly connected with the web server 206. In one embodiment, the data center 208 can used to compress all appropriate web pages and associated files from the web server.

Figure 3:
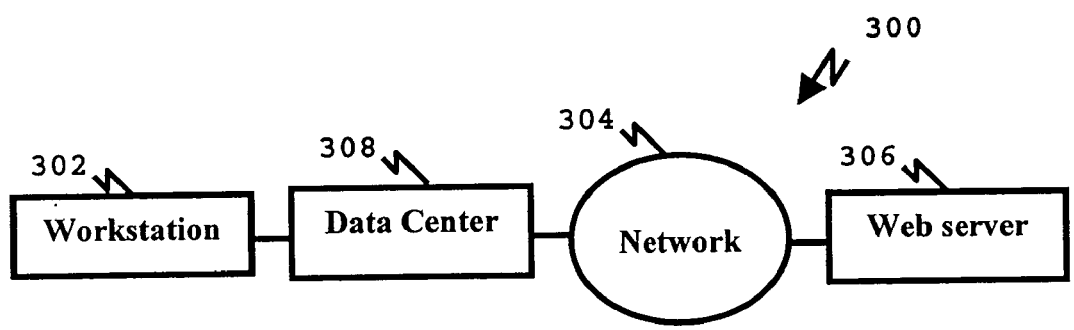
FIG. 3 is an illustration of an embodiment of the present invention including a data center near the workstation.

FIG. 3 is an illustration of an embodiment of the present invention including a data center 308 near the workstation 302 in a proxy server configuration. The system 300 includes a workstation 302 connected with a data center 308 connected with a network 304 connected with the web server 306. The data center 308 intercepts web pages from the network 204 and compresses them before they are transmitted to the workstation 302. It is preferred that workstation 302 is separated from the data center 308 by a network link. The network link can be a dial-up connection, dedicated connection, an intranet, or a private network.

In this embodiment, the data center 308 can be located at an Internet service provider (ISP) site to compress the web pages and associated files that are sent over the dial-up link to the workstation 302. Alternatively, the data center 308 could be located on a company's intranet network to compress all web pages routed from the Internet to workstations on the intranet.

In one embodiment, the data center 308 compresses all web pages for a particular workstation or set of workstations. The data center 308 builds a list of workstations 302 that wish to accept compressed web pages, then all web pages sent to those workstations 302 are compressed.

Figure 4:
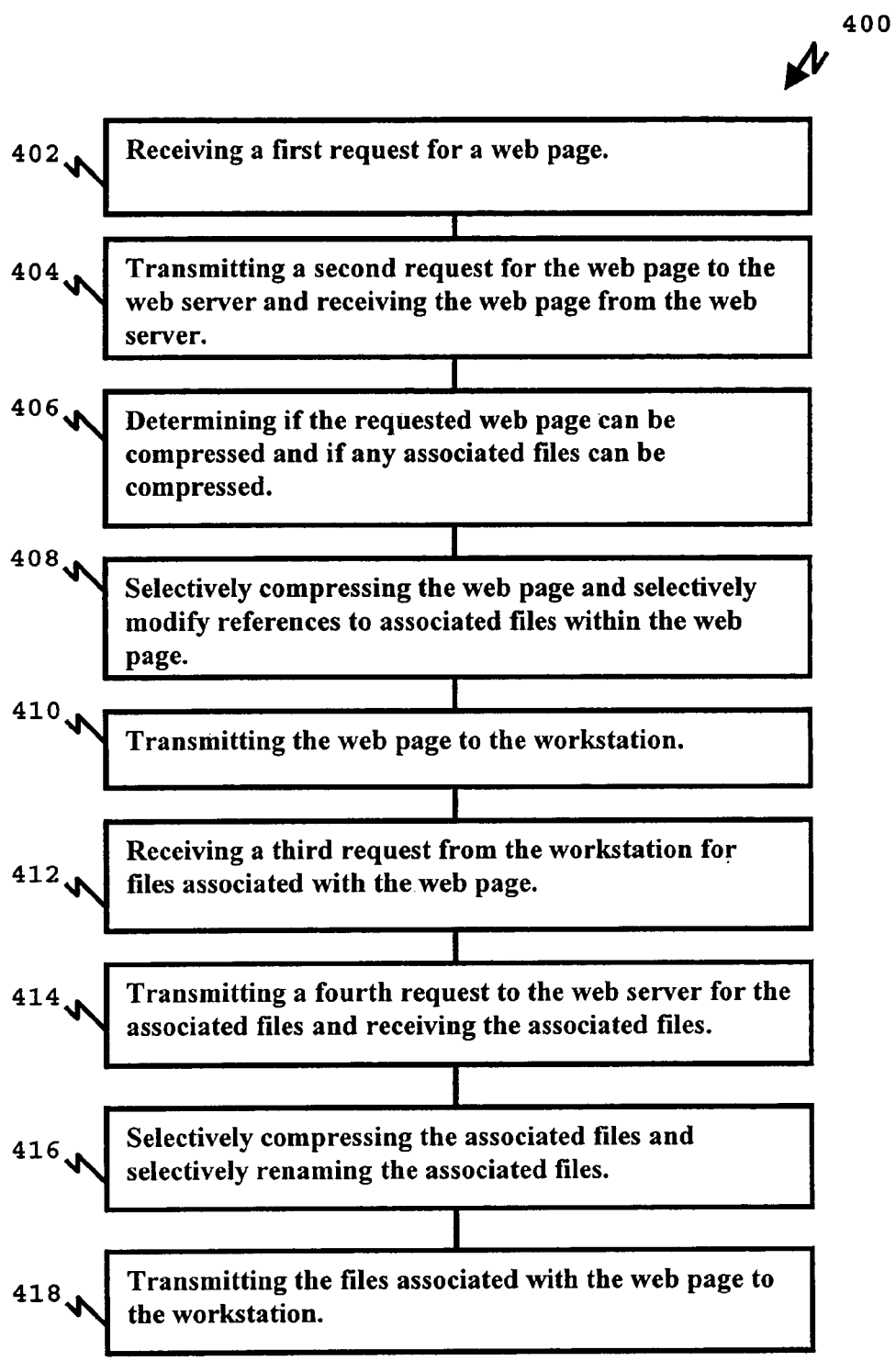
FIG. 4 is a flow chart of an embodiment of the present invention including dynamic compression near a web server.

FIG. 4 is a flow chart of an embodiment of the present invention including dynamic compression near a web server. The method of compressing data for efficient transfer includes the following steps:

In 402, a request for a web page is received at a data center or compressor. This request can be received at the ISP or other point-of-presence, across a network, or at the web server. A data center 208 (FIG. 2) or a compressor 108 (FIG. 1) can receive the web pages. Alternatively, another computer can intercept the web pages and transmit them to the data center 208 of compressor 108.

In 404, a second request is transmitted to a web server having the web page. The web page is received in response to the second request.

In 406, the request is analyzed to determine if the desired web page can be compressed. Other methods of determining if the web page can be compressed can also be used. For example, a default setting can be established for a workstation that is known to be capable of receiving compressed data or the workstation can send a separate message to the compressor indicating that the web pages should be compressed. The request can be analyzed any time after the request is received and before the web page is selectively compressed. Optionally, the request can be analyzed to determine if the web page's associated files can also be compressed.

In 408, the web page is selectively compressed. Only web pages that are to be sent to workstations that are known to be able to handle compressed files are compressed.

Optionally, references in the web page to associated files that will be compressed are altered to reflect any change such as the associated file's name, extension, or other code. Alternatively, the request for the associated files can be analyzed to determine if the associated files can be compressed. The determination can be based on the workstation's ability to handle compressed files. Since the web page was compressed, the associated files sent to the same workstation usually can also be compressed. Thus, the determination can be based on the request for the associated files, for example a flag can be set in the request, or the compressor can keep track of the workstation that received the web page and automatically compress the associated files.

In 410, the selectively compressed web page is transmitted toward the workstation. Depending on where the compression occurs, the compressed web page is transmitted toward the workstation over the Internet, over a dial-up line, over a dedicated line, over an intranet, or over some other connection.

In 412, a third request is received that requests the web page's associated files.

In 414, a fourth request is transmitted to the web server for the associated files.

In 416, the associated files are selectively compressed. For example, graphic files in the GIF format can be converted to the PNG format using a lossless transformation.

In 418, the associated files are transmitted toward the workstation.

Figure 5:
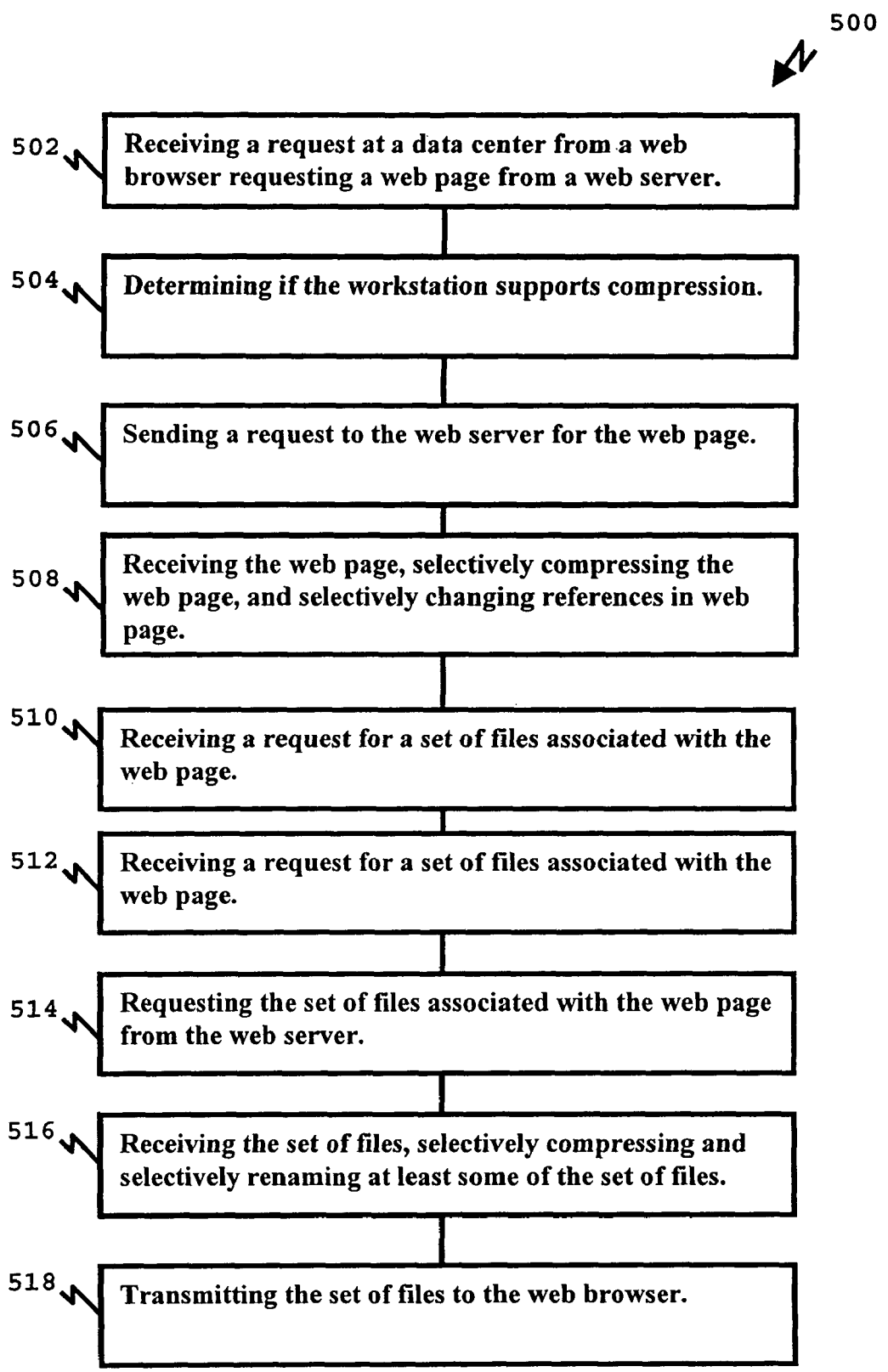
FIG. 5 is an illustration of first embodiment of the present invention including dynamic compression in a data center.

FIG. 5 is an illustration of an embodiment of the present invention including a data center. The method 500 of compressing files for transfer includes the following:

In 502, a request is received at a data center or compressor from a remote web browser requesting a web page from a web server. For example, the request can be received at an ISP, across the network, or at the web server.

In 504, the request is analyzed to determine if the web page can be compressed and optionally if the web page's associated files can be compressed.

In 506, the data center sends a request to the web server for the web page. Alternatively, the data center can retrieve the web page directly.

In 508, the web page is received, selectively compressed, and references in the web page to associated files are selectively changed at the data center.

In 510, the selectively compressed and selectively modified web page is transmitted toward the workstation.

In 512, a request for the files associated with the web page is received at the data center from the web browser.

In 514, the associated files are requested from the web server. The associated files can be a single file or a plurality of files.

In 516, the data center receives the associated files and selectively compresses and selectively renames the file. For example, the graphics file "test.gif" in the GIF format can be deflated and renamed "test.png" in the PNG format.

In 518, the associated files are transmitted to the workstation.

While preferred embodiments have been shown and described, it will be understood that they are not intended to limit the disclosure, but rather they are intended to cover all modifications and alternative methods and apparatuses falling within the spirit and scope of the invention as defined in the appended claims or their equivalents.

What is claimed is:

1. A method of transferring data, comprising:
   (a) dynamically compressing a web page based on a first request from a workstation, wherein the first request indicates the web page, by:
      determining if the first request comprises a header indication which indicates that the workstation is capable of decompressing the web page; and
      selectively compressing, by a hardware compressor, the web page based on the header indication, the web page not being compressed if the workstation is not capable of decompressing the web page; and
   (b) transmitting a first response that comprises the dynamically compressed web page from a compressor toward the workstation.

2. The method of claim 1, wherein (a) further comprises:
   receiving the first request from a browser on the workstation over a computer network.

3. The method of claim 2, wherein the transmitting further comprises:
   transmitting the first response that comprises a web page.

4. The method of claim 3, wherein (a) further comprises:
   dynamically compressing the web page based on a compression indicator in the first request.

5. The method of claim 3, wherein (b) further comprises:
   transmitting a compression indicator in the first response that indicates the web page is in a compressed format.

6. The method of claim 5, wherein (a) further comprises:
   compressing the web page into a deflate compressed data format.

7. The method of claim 6, wherein (a) further comprises:
   retrieving the web page from a web server.

8. The method of claim 7, further comprising:
   (c) receiving a second request from the workstation indicating an associated file; and
   (d) transmitting a second response from the compressor to the workstation in response to a second request;
   wherein the second response comprises at least the associated file.

9. The method of claim 8, wherein (d) further comprises:
   transmitting a plurality of files associated with the web page.

10. The method of claim 9, wherein (d) comprises:
    transmitting a set of graphic, audio, and video files associated with the web page.

11. The method of claim 8, wherein (d) further comprises:
    transmitting the associated file in a compressed format.

12. The method of claim 8, wherein (d) further comprises:
    selectively transmitting the associated file in a compressed format based on an indication in the second request that the workstation is capable of processing the associated file in a compressed format.

13. The method of claim 8, wherein (d) comprises:
    selectively transmitting the associated file in a PNG format.

14. A method of transferring data over a computer network, comprising:
    (a) receiving a first request from a workstation, the first request indicating a web page and a web server associated with the web page;
    (b) transmitting a second request to the web server, the second request requesting the web page;

(c) receiving the web page in a first format from the web server;

(d) selectively compressing, by a hardware compressor, the web page to a second format based on an indication flag which indicates that the workstation is capable of decompressing the web page, after the receiving of the web page and determining if the first request comprises the indication flag, and the web page not being compressed if the workstation is not capable of decompressing the web page; and (e) transmitting the web page to the workstation in the second format.

15. The method of claim 14, wherein (a) comprises:
receiving the first request over the computer network.

16. The method of claim 15, wherein (a) comprises:
receiving the first request at a reverse proxy server.

17. The method of claim 15, wherein (d) comprises:
selectively compressing the web page at the web server.

18. The method of claim 15, wherein (b) comprises:
transmitting the second request over a computer network.

19. The method of claim 18, wherein (a) comprises:
receiving the first request at a forward proxy server.

20. The method of claim 18, wherein (d) comprises:
selectively compressing the web page at a point of presence of the computer network.

21. The method of claim 14, wherein (d) comprises:
selectively compressing the web page using a deflate process.

22. The method of claim 14, wherein (d) comprises:
modifying a reference in the web page, wherein the reference refers to an associated file.

23. A system for transferring data over a computer network, the system comprising:

a workstation coupled with the computer network and operative to request a web page from a web server coupled with the computer network;

a proxy server with storage coupled with the computer network and operative to receive the request, determine if the request comprises an indication flag which indicates that the workstation is capable of decompressing the web page, transmit a proxied request to the web server and receive the web page from the web server in a first format; and a compressor implemented in hardware coupled with the proxy server and operative to selectively compress the web page to a second format based on the indication flag, the web page not being compressed if the workstation is not capable of decompressing the web page; and wherein the proxy server is further operative to transmit the web page to the workstation in the second format.

24. An apparatus for transferring data over a computer network, the apparatus comprising:

a request receiver coupled with the computer network and operative to receive a first request from a workstation coupled with the computer network, the request indicating a web page and a web server associated with the web page;

a request transmitter coupled with the request receiver and operative to transmit a second request to the web server; the second request comprising a request for the web page;

a web page receiver coupled with the computer network and operative to receive the web page in a first format from the web server;

a compressor implemented in hardware coupled with the web page receiver and operative to determine if the request comprises a header indication which indicates that the workstation is capable of decompressing the web page and selectively compress the received web page to a second format based on the header indication, the web page not being compressed if the workstation is not capable of decompressing the web page; and a web page transmitter coupled with the compressor and operative to transmit the web page to the workstation in the second format.

25. The method of claim 1 further comprising, selectively compressing, by the hardware compressor, subsequently requested web pages based on header indications of subsequent requests.

26. The method of claim 14 further comprising, selectively compressing, by the hardware compressor, subsequently requested web pages to other formats based on indication flags of subsequent requests.

27. The system of claim 23 wherein the compressor implemented in hardware is further operative to selectively compress subsequently requested web pages to other formats based on indication flags of subsequent requests.

28. The system of claim 24 wherein the compressor implemented in hardware is further operative to selectively compress subsequently requested web pages based on header indications of subsequent requests.

* * * * *